United States Patent
Ozawa

(10) Patent No.: US 12,397,760 B2
(45) Date of Patent: Aug. 26, 2025

(54) DRIVING ASSISTANCE APPARATUS, DRIVING ASSISTANCE METHOD, AND DRIVING ASSISTANCE PROGRAM

(71) Applicant: J-QuAD DYNAMICS Inc., Tokyo (JP)

(72) Inventor: Yuuki Ozawa, Tokyo (JP)

(73) Assignee: J-QUAD DYNAMICS Inc.

( * ) Notice: Subject to any disclaimer, the term of this patent is extended or adjusted under 35 U.S.C. 154(b) by 126 days.

(21) Appl. No.: 18/364,270

(22) Filed: Aug. 2, 2023

(65) Prior Publication Data

US 2024/0017704 A1    Jan. 18, 2024

Related U.S. Application Data

(63) Continuation of application No. PCT/JP2022/003573, filed on Jan. 31, 2022.

(30) Foreign Application Priority Data

Feb. 4, 2021    (JP) .................. 2021-016468

(51) Int. Cl.
*B60T 8/17*      (2006.01)
*B60T 8/1763*    (2006.01)
(Continued)

(52) U.S. Cl.
CPC .......... *B60T 8/1763* (2013.01); *B60W 10/18* (2013.01); *B60W 30/09* (2013.01); *B60W 30/0956* (2013.01); *B60W 40/068* (2013.01); *B60W 40/103* (2013.01); *B60W 50/0098* (2013.01); *B60T 2201/022* (2013.01); *B60T 2210/12* (2013.01); *B60T 2230/02* (2013.01);
(Continued)

(58) Field of Classification Search
CPC .... B60T 8/1763; B60T 8/1755; B60T 8/1761; B60T 8/26; B60T 8/28; B60T 2201/022; B60T 2230/02; B60T 2210/12; B60W 10/18; B60W 30/09; B60W 30/0956; B60W 40/068; B60W 40/103; B60W 50/0098; B60W 2050/0083; B60W 2520/20; B60W 2552/40; B62D 6/00; G08G 1/16
USPC .................. 701/41, 42, 43, 44, 70, 71
See application file for complete search history.

(56) References Cited

U.S. PATENT DOCUMENTS

2017/0327110 A1    11/2017    Inoue et al.
2019/0299948 A1    10/2019    Maeda et al.

FOREIGN PATENT DOCUMENTS

JP    H07-025325 A    1/1995
JP    2000-128007 A   5/2000
(Continued)

*Primary Examiner* — Hai H Huynh
(74) *Attorney, Agent, or Firm* — Maschoff Brennan

(57) ABSTRACT

A driving assistance apparatus is applied to a vehicle (VC) including a wheel-turning actuator (32) that turns a wheel and a brake actuator (41-44). The driving assistance apparatus is configured to detect, as a slip detection process (S22), slip of the vehicle on a road surface on which the vehicle is traveling. The limitation process (S24, S24a) limits the a braking force of the brake actuator to a smaller magnitude. The limitation process includes a process where the braking force of the brake actuator is limited to the smaller magnitude at least during the period over which the obstacle is being avoided when the wheel-turning actuator of the vehicle turns the wheel in order to avoid an obstacle and when the slip has been detected at the slip detection process.

11 Claims, 7 Drawing Sheets

(51) Int. Cl.
*B60W 10/18* (2012.01)
*B60W 30/09* (2012.01)
*B60W 30/095* (2012.01)
*B60W 40/068* (2012.01)
*B60W 40/103* (2012.01)
*B60W 50/00* (2006.01)

(52) U.S. Cl.
CPC . *B60W 2050/0083* (2013.01); *B60W 2520/20* (2013.01); *B60W 2552/40* (2020.02)

(56) References Cited

FOREIGN PATENT DOCUMENTS

| JP | 2004090679 A | * | 3/2004 | ............. B60K 31/00 |
|----|--------------|---|--------|---------------------------|
| JP | 2004-155303 A | | 6/2004 | |
| JP | 3624285 B2 | * | 3/2005 | ............... G01D 5/00 |
| JP | 2020-050342 A | | 4/2020 | |
| JP | 2020-083048 A | | 6/2020 | |

* cited by examiner

FIG. 3
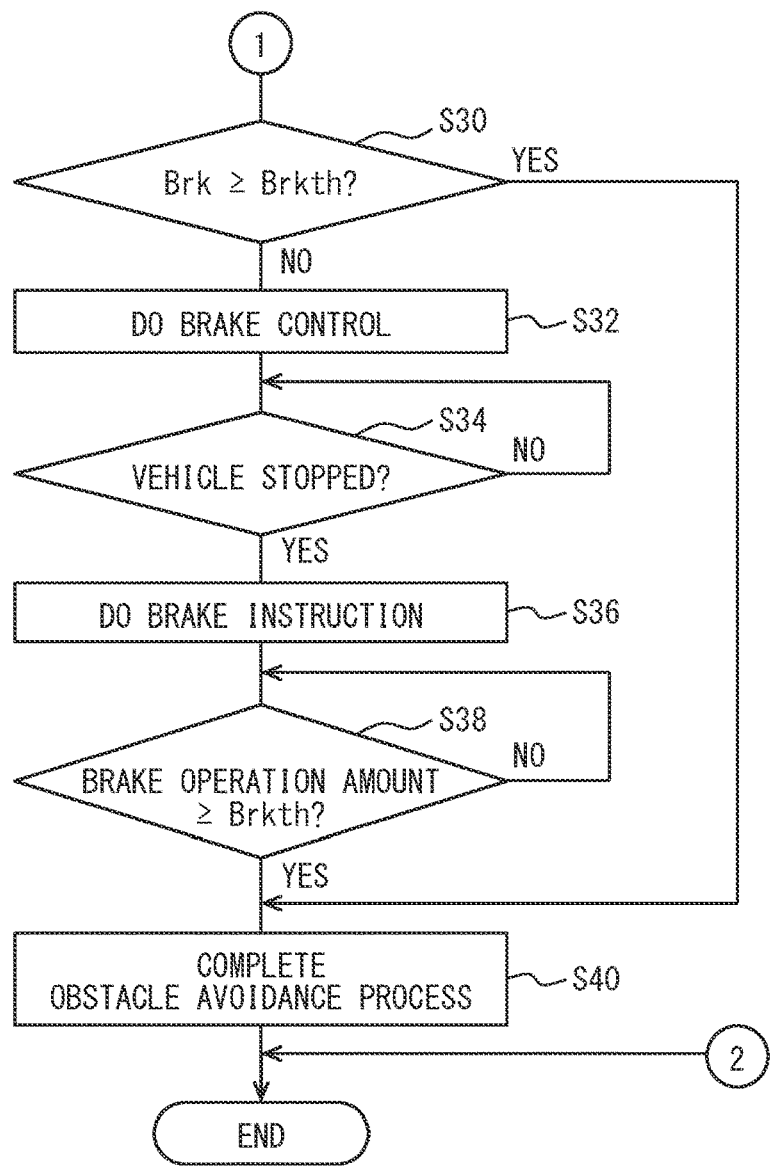
FIG. 4 (a) 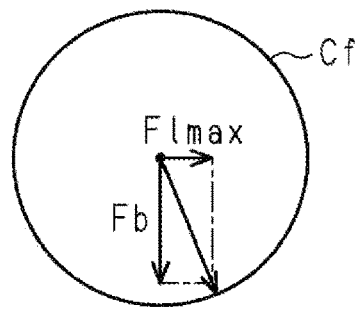 (b) 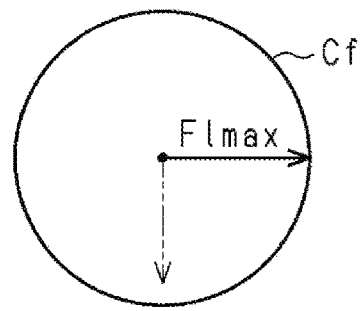

DRIVING ASSISTANCE APPARATUS, DRIVING ASSISTANCE METHOD, AND DRIVING ASSISTANCE PROGRAM

CROSS REFERENCE TO RELATED APPLICATIONS

The present application is based on Japanese Patent Application No. 2021-016468 filed on Feb. 4, 2021. The entire disclosures of the above application are incorporated herein by reference.

TECHNICAL FIELD

The present disclosure relates to a driving assistance apparatus, a driving assistance method, and a driving assistance program.

BACKGROUND

For example, Patent Literature 1 discloses a device of a comparative example configured to change a traveling route of a vehicle by automated steering when there is a risk of contact of the vehicle with a pedestrian or the like due to vehicle traveling straight ahead.

PRIOR ART LITERATURE

Patent Literature

JP 2017-206040 A

SUMMARY OF THE INVENTION

During traveling on a low friction test road such as an icy road, when a driver steps on brakes suddenly to avoid colliding with an obstacle in front of the vehicle, the tires may lock. In this case, the vehicle cannot be turned sufficiently even when an attempt is made to change the traveling route by automated steering as in the above device.

Hereinafter, means to solve the above-described problems and its operation and effects will be described below. 1. A driving assistance apparatus is applied to a vehicle (VC) including a steering-turning actuator (32) that turns a steering-turning wheel and a brake actuator (41-44). The apparatus configured to: detect, as a detection process (S22), slip of the vehicle on a road surface on which the vehicle travels; limit, as a limitation process (S24, S24a) a magnitude of a braking force of the brake actuator to a smaller magnitude; and when the steering-turning actuator of the vehicle turns the steering-turning wheel in order to avoid an obstacle and when the slip has been detected, limit the magnitude of the braking force of the brake actuator to the smaller magnitude in at least a period for avoiding the obstacle.

In the above configuration, the magnitude of the braking force of the brake actuator is limited to the smaller magnitude when the vehicle turns the steered wheels to avoid the obstacle and the slip has been detected. Thereby, it is possible to increase the lateral force generated in the tire as compared with a configuration without the limit. Therefore, it is possible to turn the vehicle as intended by turning the wheel. Therefore, according to the above configuration, it is possible to turn the vehicle to avoid the obstacle even on the road surface with a small friction coefficient.

BRIEF DESCRIPTION OF DRAWINGS

The above and other objects, features and advantages of the present disclosure will become more apparent from the following detailed description made with reference to the accompanying drawings:

FIG. 3 is a flowchart showing a procedure of processes executed by the ADAS ECU according to the embodiment;

FIG. 4A shows a diagram for illustrating a principle of the embodiment;

FIG. 4B shows a diagram for illustrating a principle of the embodiment;

DETAILED DESCRIPTION

First Embodiment

Figure 1:
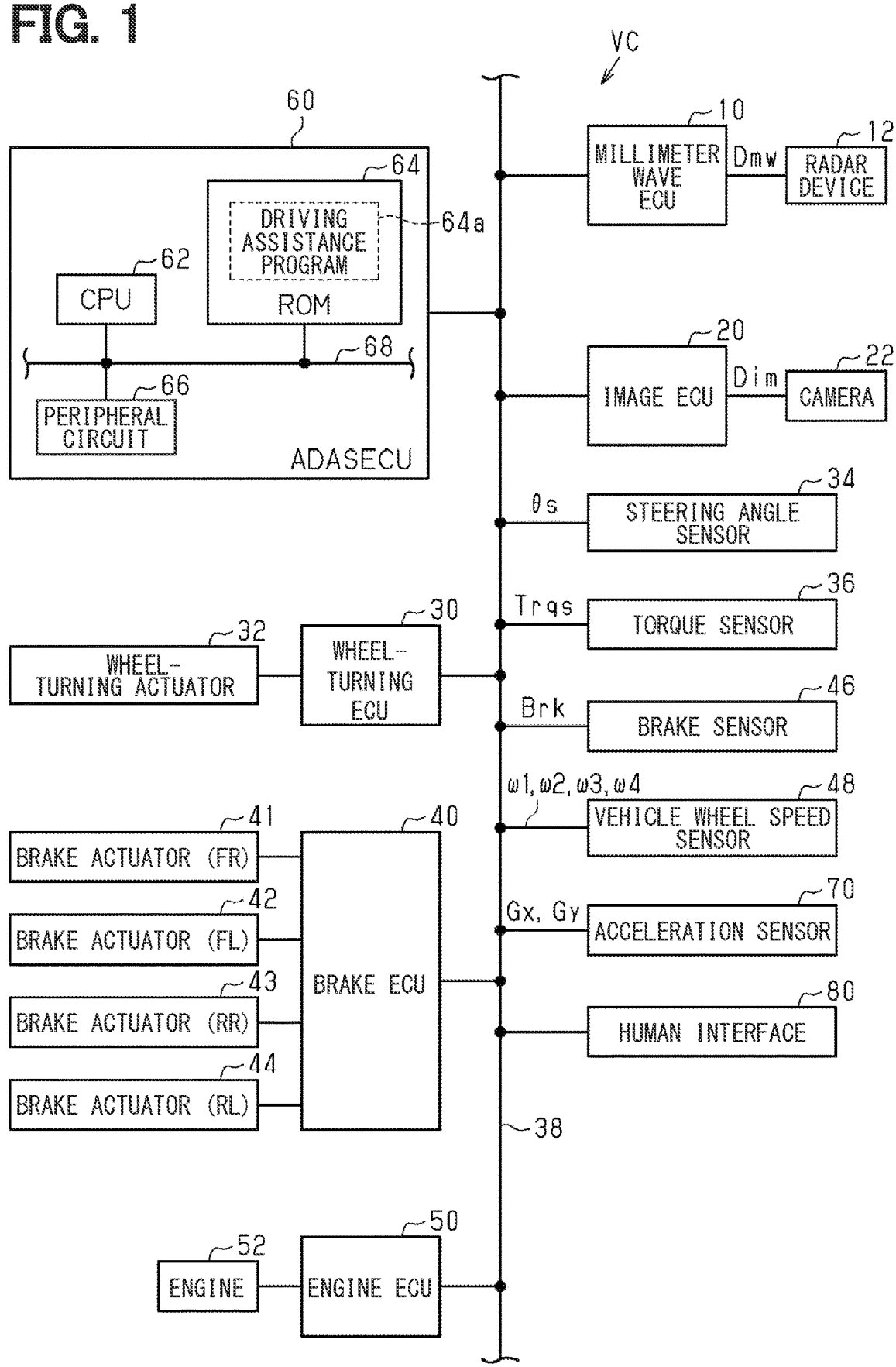
FIG. 1 is a block diagram showing a configuration of devices in a vehicle according to a first embodiment.

Hereinafter, a first embodiment will be described with reference to the drawings. FIG. 1 shows a part of a configuration of a vehicle VC according to the present embodiment.

As shown in FIG. 1, a radar device 12 transmits millimeter wave radar around the vehicle VC, receives the millimeter wave radar reflected from an object around the vehicle VC, and outputs, as millimeter wave data Dmw, signals related to a distance with the object, which has reflected the millimeter wave radar. The millimeter wave data Dmw is taken into a millimeter wave ECU 10. The millimeter wave ECU 10 executes a recognition process for recognizing an object around the vehicle VC based on the millimeter wave data Dmw.

On the other hand, image data Dim, which is data related to an image captured by a camera 22, is input to an image ECU 20. The image ECU 20 executes the recognition process for recognizing the object around the vehicle VC based on the image data Dim.

A wheel-turning ECU 30 is an electronic control unit that controls wheels by operating a wheel-turning actuator 32 that turns the wheels. The wheel-turning ECU 30 acquires a wheel-turning angle θs detected by a steering angle sensor 34 and a steering torque Trqs detected by a torque sensor 36 via a local network 38. The steering torque Trqs is a torque that the driver inputs to the steering wheel. Then, the wheel-turning ECU 30 operates the wheel-turning actuator 32 according to the steering torque Trqs when the driver is driving the vehicle VC. At that time, the wheel-turning ECU 30 refers to the wheel-turning angle θs.

A brake ECU 40 is an electronic control unit that controls a braking force of the vehicle VC by operating brake actuators 41 to 44. The brake ECU 40 acquires a brake operation amount Brk, which is a depression amount of a brake pedal and detected by a brake sensor 46 via a local network 38. Further, the brake ECU 40 also receives wheel speeds ω1 to ω4, which are rotational speeds of the respective wheels and detected by wheel speed sensors 48 via the local network 38. The brake actuator 41 is an actuator that applies a braking force to a right front wheel. Further, the brake actuator 42 is an actuator that applies the braking force to a left front wheel. Further, the brake actuator 43 is an actuator that applies the braking force to a right rear wheel. Further, the brake actuator 44 is an actuator that applies the braking force to a left rear wheel.

The brake ECU 40 moderates the rate of increase of the braking force as compare with a sudden increase in the brake operation amount Brk, and performs a control for reducing the magnitude of the braking force when a wheel slip is detected based on wheel speeds ω1 to ω4. In other words, the brake ECU 40 is equipped with an antilock braking system (ABS) that performs antilock braking control.

The engine ECU 50 is an electronic control unit that operates various operation units of an engine 52 for controlling the torque, the exhaust component ratio, or the like of the engine 52. The engine is a control target that is a thrust generation device of the vehicle. The torque and the exhaust component ratio are control amounts.

An ADAS (Advance driver assistance system) ECU 60 is an electronic control unit that assists the driver in driving of the vehicle. The ADAS ECU 60 has a CPU 62, a ROM 64 and a peripheral circuit 66 which are connected via a communication line 68. The ROM 64 stores a driving assistance program 64a. The ADAS ECU 60 executes a process of assisting the driver in driving of the vehicle VC by the CPU 62 executing the driving assistance program 64a.

Figure 2:
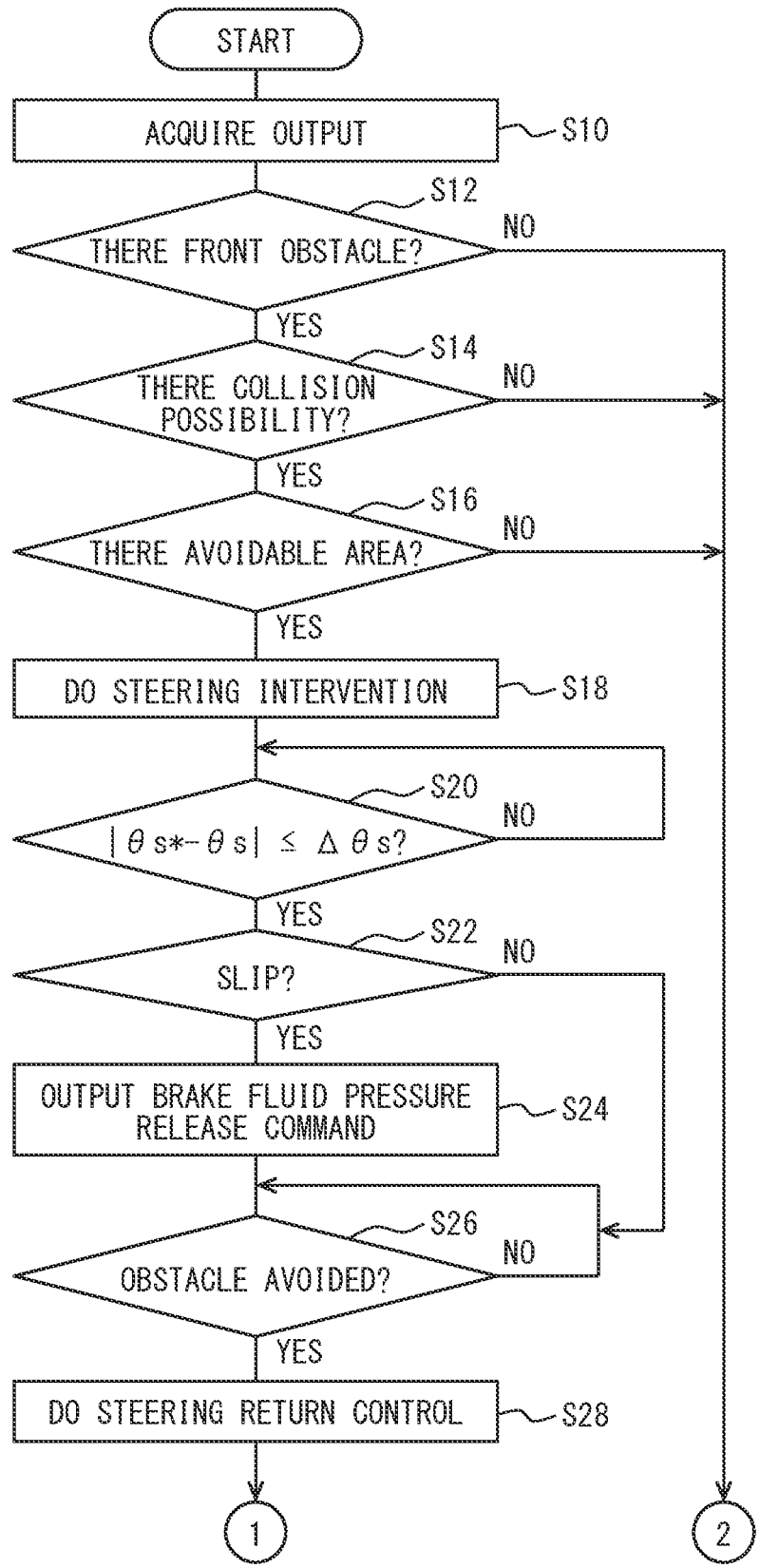
FIG. 2 is a flowchart showing a procedure of processes executed by an ADAS ECU according to the embodiment.

FIG. 2 and FIG. 3 show a procedure of a driving assistance process, especially a process of avoiding a collision with an obstacle. The processes shown in FIGS. 2 and 3 are implemented by the CPU 62 executing commands defined in the driving assistance program 64a each time a predetermined condition is satisfied. Hereinafter, the process number of each process is represented by a number prefixed with "S".

In the series of processes shown in FIG. 2, the CPU 62 first acquires the result of object recognition by the millimeter wave ECU 10 and the result of object recognition by the image ECU 20 (S10). Then, the CPU 62 determines whether there is an obstacle ahead of the vehicle VC in a traveling direction based on each recognition result (S12). Here, the obstacle is an object, such as a front vehicle (also referred to as a preceding vehicle), which may come into contact with the vehicle VC as the vehicle VC travels. The CPU 62 may predict the forward traveling direction of the vehicle VC according to the wheel-turning angle θs and the shape of the road. When determining that there is the obstacle (S12: YES), the CPU 62 determines whether the vehicle VC is likely to collide with the obstacle (S14). In this process, the CPU 62 inputs the speed of the vehicle VC calculated based on the wheel speeds ω1 to ω4. At this time, the CPU 62 may refer to a longitudinal acceleration Gx and a lateral acceleration Gy of the vehicle VC. The accelerations are detected by an acceleration sensor 70 shown in FIG. 1. A relative speed between the obstacle and the vehicle VC is an important variable in determining whether the vehicle is going to collide with the obstacle. The relative speed can be calculated based on the speed of the vehicle VC described above. Furthermore, for example, when the radar device 12 is an FMCW (Frequency Modulated Continuous Wave) system device, the millimeter wave data Dmw has information on the relative speed with respect to obstacle, so this may be taken into consideration.

When determining that there is a possibility of collision (S14: YES), the CPU 62 determines whether there is a collision avoidable area in which the vehicle VC can travel (S16). This process is a process in which the recognition result of the object by the millimeter wave ECU 10 and the recognition result of the object by the image ECU 20 are input.

When the CPU 62 determines that there is the avoidable area (S16: YES), the CPU 62 executes a steering intervention process of operating the wheel-turning actuator 32 to change the traveling route of the vehicle VC to the avoidable area (S18). That is, the CPU 62 sets a target trajectory for causing the vehicle VC to travel to the avoidable area, and calculates a wheel-turning angle command value θs*, which is a command value of the wheel-turning angle θs for traveling along the target trajectory. Then, the CPU 62 outputs the steering angle command value θs* to the wheel-turning ECU 30 via the local network 38. Thereby, the wheel-turning ECU 30 executes a process of operating the wheel-turning actuator 32 to perform a feedback control of the wheel-turning angle θs to the steering angle command value θs*. That is, in this case, the wheel-turning angle θs is controlled to the steering angle command value θs* by cooperation of the ADAS ECU 60 and the wheel-turning ECU 30 regardless of the operation of the steering wheel by the driver.

Then, the CPU 62 waits until the absolute value of the difference between the wheel-turning angle θs and the steering angle command value θs* becomes equal to or less than a threshold Δθs (S20: NO). This process is a process of determining whether the wheel-turning angle θs has followed the wheel-turning angle command value θs*. In other words, this is the process of determining whether the wheel-turning angle θs has been as instructed by the steering intervention. This process may be set to a process of determining whether to receive, from the wheel-turning ECU 30, a signal indicating that the absolute value of the difference between the wheel-turning angle θs and the wheel-turning angle command value θs* is equal to or less than a threshold value θΔs. However, instead of this, the CPU 62 itself may receive the wheel-turning angle θs and determine whether the absolute value of the difference between the wheel-turning angle θs and the wheel-turning angle command value θs* is equal to or less than the threshold value θΔs.

When the value is equal to or less than the threshold value θΔs (S20: YES), the CPU 62 determines whether the vehicle VC is slipping (S22). The occurrence of slip may be determined, for example, as follows. That is, the determination is performed based on a state that the wheel speeds ω1 to ω4 are zero and a fact indicating that the vehicle VC has a certain vehicle speed. The state is obtained from the recognition result of the object by the millimeter wave ECU 10 and the recognition result of the object by the image ECU 20.

When the CPU 62 determines that the slip has occurred (S22: YES), the CPU 62 executes the process of limiting the braking force of the brake actuators 41 to 44 to be the smaller value (S24). Specifically, the CPU 62 outputs a brake fluid pressure release command to the brake ECU 40 in order to minimize the braking force by the brake actuators 41 to 44 (S24). The brake fluid pressure release command is a command to open the control valves that control the hydraulic fluid pressure of the brake actuators 41 to 44. Thereby, the brake ECU 40 opens the control valves to reduce the pressure of the hydraulic oil in the brake actuators 41 to 44 to the minimum value.

When completing the process of S24 and when making a negative determination in the process of S22, the CPU 62 waits until the obstacle is avoided based on the output of the millimeter wave ECU 10 and the output of the image ECU 20 (S26: NO). When the CPU 62 determines that the obstacle has been avoided (S26: YES), the CPU 62 executes steering return control to change the wheel-turning angle command value $\theta s^*$ to a predetermined angle corresponding to the value before the start of the process of S18 (S28). Here, for example, when the vehicle VC is traveling in a straight lane, when the vehicle VC goes to the adjacent lane for avoidance, and when the vehicle VC is traveling straight ahead before the avoidance, the predetermined angle is same as the value before the start of the process of S18. However, when the value before the start of the process of S18 is an inappropriate value for causing the vehicle VC to proceed straight in the lane where the vehicle VC is traveling for the avoidance, the predetermined angle is not set to the same value as the value before the start of the process of S18, but the predetermined value is set to a value that is adjusted to an appropriate value for causing the vehicle VC to travel straight. In this process, the CPU 62 substitutes the predetermined angle for the wheel-turning angle command value $\theta s^*$ and outputs the wheel-turning angle command value $\theta s^*$ to the wheel-turning ECU 30 via the local network 38. Thereby, the wheel-turning ECU 30 controls the wheel-turning angle $\theta s$ to a new wheel-turning angle command value $\theta s^*$.

Then, the CPU 62 determines whether the brake operation amount Brk is equal to or greater than the threshold value Brkth (FIG. 3: S30). The threshold Brkth is set to an appropriate value for stopping the vehicle VC. This process is a process of determining whether the driver is operating the brake pedal to stop the vehicle VC. When determining that it is less than the threshold Brkth (S30: NO), the CPU 62 outputs a command to the brake ECU 40 so as to apply a braking force for stopping the vehicle VC (S32). Thereby, the brake ECU 40 operates the brake actuators 41 to 44 to stop each wheel. At this time, the ABS function may be activated.

Then, the CPU 62 waits until the vehicle VC stops (S34: NO). This process may be determined, for example, based on whether the wheel speeds $\omega 1$ to $\omega 4$ are zero. When determining that the vehicle VC has stopped (S34: YES), the CPU 62 instructs the driver to depress the brake pedal by operating a human interface 80 shown in FIG. 1 (S36). Here, the human interface 80 may be a head-up display. In that case, the process of S36 becomes a process of displaying visual information on the head-up display. Also, the human interface 80 may be a speaker. In that case, the process of S36 becomes a process of outputting the sound from a microphone.

The CPU 62 waits until the brake operation amount Brk becomes equal to or greater than the threshold value Brkth (S38). When the CPU 62 determines that the brake operation amount Brk has been the threshold Brkth or more (S38: YES) and when the CPU 62 makes the positive determination in the process of S30, the obstacle avoidance process is completed (S40). That is, the driving of the vehicle VC is left to the driver, and the forced control of the wheel-turning angle $\theta s$ and the braking force by the ADAS ECU 60 is stopped. Here, the CPU 62 notifies the wheel-turning ECU 30 and the brake ECU 40 via the local network 38 that the avoidance process has been completed.

When the process of S40 is completed or when the negative determination is made in the process of S12, S14, or S16 shown in FIG. 2, the CPU 62 temporarily ends the series of processes shown in FIGS. 2 and 3.

Here, the action and effect of this embodiment will be described. While the driver is driving the vehicle VC, the CPU 62 monitors whether the vehicle VC can travel safely based on the output of the millimeter wave ECU 10 and the output of the image ECU 20. When the CPU 62 detects the obstacle ahead of the vehicle VC in the traveling direction and determines that there is a possibility of collision with the obstacle, the CPU 62 executes steering intervention. After the steering intervention, the CPU 62 determines the presence or absence of slip, and outputs a brake fluid pressure release command to the brake ECU 40 when slip occurs. This is a process for increasing the lateral force acting on the wheels. Hereinafter, this process will be described.

FIGS. 4A and 4B show the frictional force acting on the tire. FIGS. 4A and 4B show a friction circle Cf in which the magnitude of the frictional force is equal over 360°. FIG. 4A shows a maximum value Flmax of the lateral force acting on the vehicle VC when a braking force Fb is large. Since the magnitude of the frictional force acting on the tire cannot go outside the friction circle Cf, the maximum value Flmax in this case is small. The lateral force of the front wheels serves as a steering force, and the lateral force of the rear wheels serves as a force to keep the vehicle VC stable. Therefore, when the lateral force maximum value Flmax is small, the vehicle VC cannot be turned sufficiently. In other words, even when the wheel-turning angle $\theta s$ is controlled to the steering angle command value $\theta s^*$, a sufficient yaw rate cannot be generated and the vehicle VC cannot be turned toward the target direction.

Therefore, the CPU 62 outputs the brake fluid pressure release command to the brake ECU 40 when the slip is detected. Thereby, as shown in FIG. 4B, the maximum value Flmax of the lateral force can be set to a large value.

Figure 5:
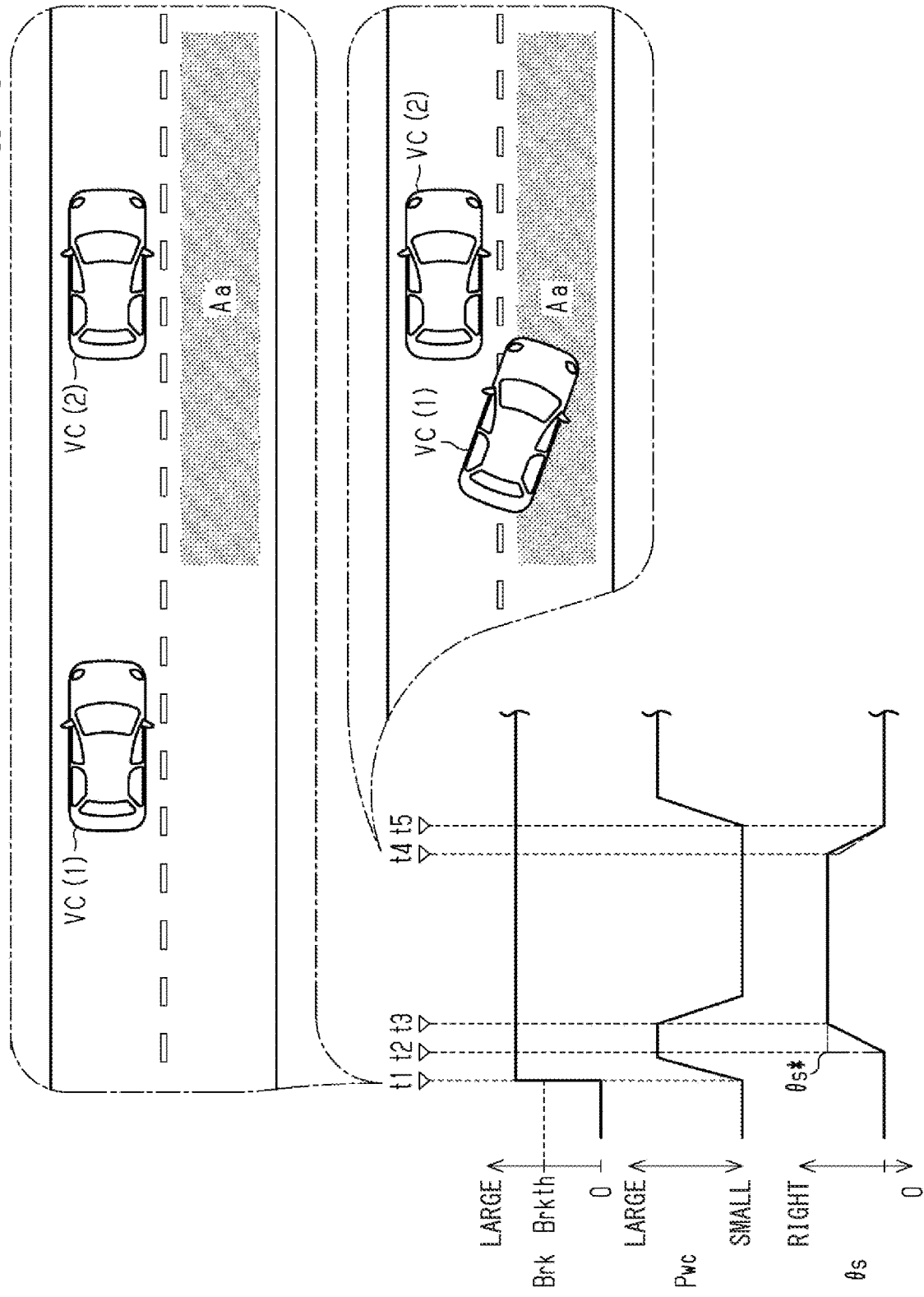
FIG. 5 is a time chart for illustrating an action of the embodiment.

FIG. 5 illustrates an obstacle avoidance process on a road surface with a small coefficient of friction, such as a snowy road. In FIG. 5, the vehicle VC shown in FIG. 1 is described as a vehicle VC(1), and the front vehicle as an obstacle is described as a vehicle VC(2).

As shown in FIG. 5, at time t1, the driver anticipates a collision with the vehicle VC(2) and steps on the brake suddenly, causing the brake operation amount Brk to rise sharply. Thereby, the hydraulic oil pressure Pwc of the brake actuators 41 to 44 rises sharply. Here, when determining that there is a possibility of collision with the vehicle VC(2), the CPU 62 executes the steering intervention at time t2. In FIG. 5, the collision avoidable area set by the CPU 62 is referred to as an avoidance area Aa. Thereby, the wheel-turning angle command value $\theta s^*$ is set to a right turn side value in order to change the traveling lane of vehicle VC(1) to an adjacent right lane. Then, at time t3 when the wheel-turning angle $\theta s$ follows the wheel-turning angle command value $\theta s^*$, the CPU 62 instructs the brake ECU 40 to minimize the braking force by the brake actuators 41 to 44. Thereby, the lateral force increases, and the vehicle VC can be turned to the right in accordance with the wheel-turning angle $\theta s$, and the vehicle VC can travel to the avoidance area Aa.

Then, at time t4 when it is determined that the vehicle VC has entered the avoidance area Aa and the collision has been avoided, the CPU 62 instructs the wheel-turning ECU 30 to return the wheel-turning angle $\theta s$ to the straight traveling direction. Thereby, the longitudinal direction of the vehicle VC can be controlled in the direction along the lane in the avoidance area Aa. At time t5 when the wheel-turning angle θs is returned to the straight-ahead direction, the CPU 62 notifies the brake ECU 40 and the like that the process for collision avoidance is completed because the brake operation amount Brk is equal to or greater than the threshold value Brkth. Thereby, the brake ECU 40 operates the brake actuators 41 to 44 according to the brake operation amount Brk.

According to the present embodiment described above, the actions and effects described below can be obtained. (1) The CPU 62 changes the wheel-turning angle command value θs* to the predetermined angle according to the value before the collision avoidance when the collision is avoided. Thereby, it is possible to keep the front of the vehicle VC along the lane.

(2) The CPU 62 maintains the braking force of the brake actuators 41 to 44 at the minimum value until the wheel-turning angle command value θs* is changed to the predetermined angle corresponding to the value before the collision avoidance. Thereby, it is possible to control the direction of the vehicle VC after the collision avoidance to the target direction.

(3) When the driver releases the brake at the time of change of the wheel-turning angle command value θs to the predetermined angle corresponding to the value before the collision avoidance, the CPU 62 stops the vehicle VC by operating the brake actuator via the brake ECU 40. Thereby, it is possible to complete the process for the collision avoidance while the vehicle VC is stopped.

Second Embodiment

The second embodiment will be described below with reference to the drawings, focusing on differences from the first embodiment.

In the above-described embodiment, when the vehicle VC is turned to avoid the collision and the vehicle VC is slipping, the braking force of the brake actuators 41 to 44 is set to the minimum value to increase the maximum value Flmax of the lateral force of the front and rear wheels. On the other hand, in the present embodiment, the braking forces of the brake actuators 43 and 44 are not set to the minimum value for the rear wheels.

Figure 6:
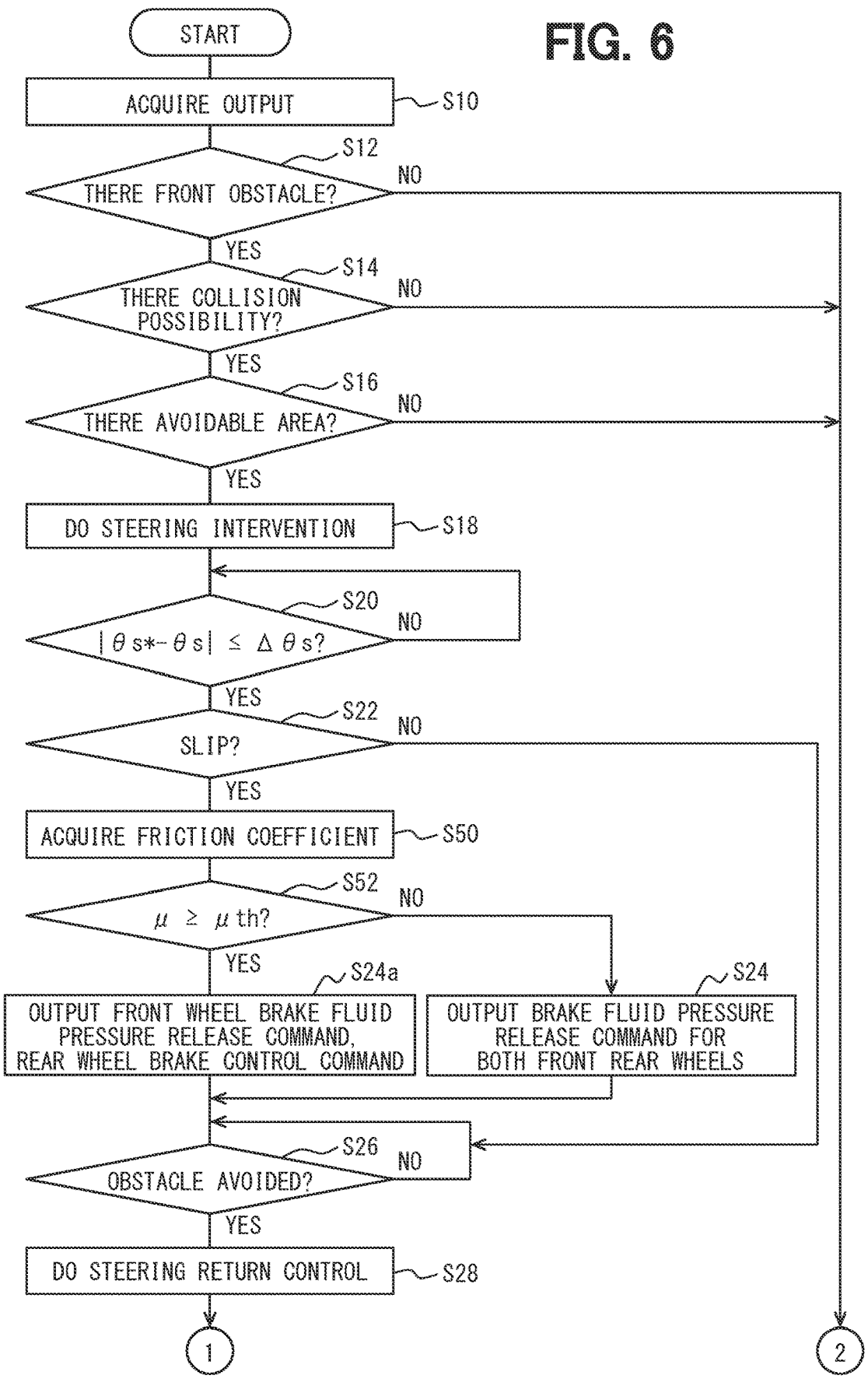
FIG. 6 is a flowchart showing a procedure of processes executed by the ADAS ECU according to the embodiment.

FIG. 6 shows a procedure of processes executed by the ADAS ECU 60 in the present embodiment. In the processes shown in FIG. 6, the same process numbers are assigned to the processes corresponding to the processes shown in FIG. 2, and the description thereof is omitted.

In the series of processes shown in FIG. 6, the CPU 62 acquires a friction coefficient μ of the road surface (S50) when the determination in S22 is positive. The friction coefficient μ may be calculated by the CPU 62 as, for example, a frictional force according to a friction coefficient μ immediately before the slip detection of the braking force obtained from the longitudinal acceleration Gx and a vehicle body weight of the vehicle VC. Here, the slip can be quantified by, for example, the ratio of the vehicle speed calculated from the wheel speeds ω1 to ω4 to the vehicle speed calculated from the wheel speeds ω1 to ω4.

Next, the CPU 62 determines whether the friction coefficient μ is greater than or equal to a threshold value μth (S52). The threshold μth is set to a value that allows a certain amount of braking force to be applied to the tire. When the CPU 62 determines that the value is less than the threshold μth (S52: NO), the process proceeds to S24.

On the other hand, when the CPU 62 determines that it is equal to or greater than the threshold μth (S52: YES), the brake ECU 40 causes the brake ECU 40 to minimize the braking force of the brake actuators 41 and 42 for the front wheels and apply the braking force to the rear wheels (S24*a*).

In addition, the CPU 62 transfers to the process of S26, when the processes of S24 and S24*a* are completed. Here, the action and effect of this embodiment will be described.

Figure 7:
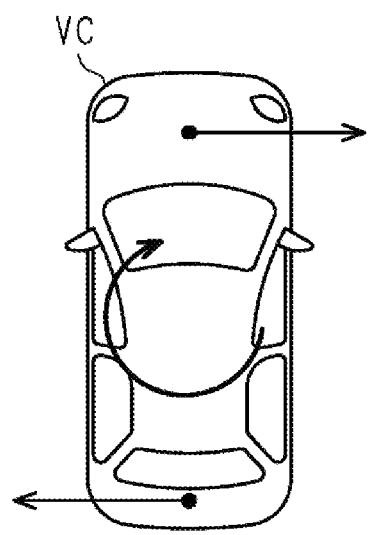
FIG. 7 is a diagram for illustrating the principle of the embodiment.

When the CPU 62 determines that there is the slip after the steering intervention and determines that the friction coefficient μ of the road surface is equal to or greater than the threshold value μth, the CPU 62 minimizes the braking force of the brake actuators 41 and 42 for the front wheels. On the other hand, the CPU 62 applies to the rear wheels the frictional force, which is equal to or less than the maximum value of the tire frictional force determined by the friction coefficient μ and is greater than zero. Thereby, the lateral force applied to the rear wheels becomes smaller than when the braking force of the brake actuators 43 and 44 is minimized, so that the rear wheels tend to slip on the outside of the turn. Therefore, when the vehicle VC is turned to the right, as shown in FIG. 7, the rear side of the vehicle VC tends to slip to the left, so that it is easier to turn the vehicle VC to the right.

When the friction coefficient μ is excessively small, there is a concern that the vehicle VC may spin due to this control. Therefore, the CPU 62 outputs a command to minimize the braking force of the brake actuators 43 and 44 for the rear wheels as well.

Third Embodiment

The third embodiment will be described below with reference to the drawings, focusing on differences from the first embodiment.

In FIG. 4B, the braking force Fb is schematically set to zero by minimizing the braking force of the brake actuators 41 to 44. However, the engine 52 actually applies the load torque to the drive wheels even when the brake operation is performed by the driver and the engine 52 is in an idling or fuel cut control state. Therefore, even when the braking force of the brake actuators 41 to 44 is minimized, the braking force of the drive wheels does not become zero. Of course, by minimizing the braking force of the brake actuators 41 to 44, the maximum value Flmax of the lateral force can greatly increase compared to the case where the braking force is not minimized. Therefore, it is easier to turn the vehicle VC by the steering intervention. However, the size of the friction circle Cf shown in FIGS. 4A and 4B becomes smaller as the friction coefficient μ of the road surface becomes smaller. Therefore, in a case where the friction coefficient μ is excessively small, even when the braking force of the brake actuators 41 to 44 is minimized, there is a risk that sufficient lateral force cannot be obtained. In the present embodiment, a process for dealing with such a situation is added.

Figure 8:
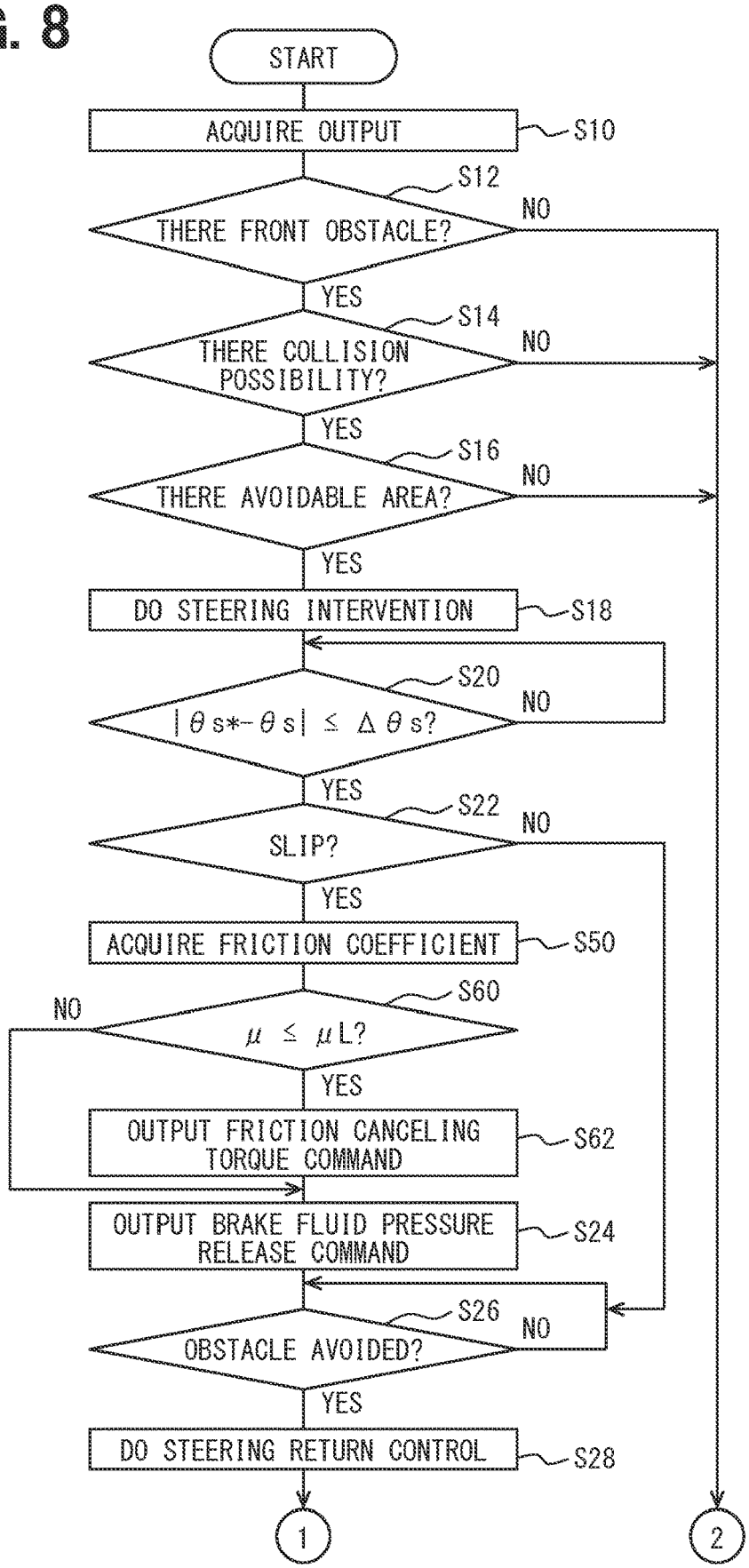
FIG. 8 is a flowchart showing a procedure of processes executed by the ADAS ECU according to the embodiment.

FIG. 8 shows a procedure of processes executed by the ADAS ECU 60 in the present embodiment. In the processes shown in FIG. 8, the same process numbers are assigned to the processes corresponding to the processes shown in FIG. 6, and the description thereof is omitted.

In the series of processes shown in FIG. 8, when completing the process of S50, the CPU 62 determines whether the friction coefficient μ is equal to or less than the specified value μL (S60). Here, the specified value μL is set to a value at which sufficient lateral force cannot be obtained even when the braking force of the brake actuators 41 to 44 is minimized. When determining that the value is equal to or less than the specified value μL (S60: YES), the CPU 62 outputs a command to the engine ECU 50 so that the engine 52 generates torque for reducing the braking force applied to the drive wheels to zero (S62). Thereby, the engine ECU 50 increases the output of the engine 52 to prevent the engine or the like from applying braking force to the drive wheels. The torque of the engine at this time is a value that does not apply drive force to the drive wheels.

When the CPU 62 completes the process of S62 or makes a negative determination in the process of S60, the CPU 62 proceeds to the process of S24. As described above, according to the present embodiment, when the slip is detected, the load torque applied to the drive wheels by the engine 52 is offset, so that it is possible to generate a larger lateral force in the tire than a force with no offset. In particular, since the CPU 62 increases the output of the engine 52 only when the slip is detected and the value of the friction coefficient μ is small, the energy consumption does not increase unnecessarily.

Other Embodiments

The above-described embodiments may be modified as follows. The above-described embodiments and the following modifications can be implemented in combination with one another as long as there is no technical contradiction.
"Slip Detection Process"

In the above-described embodiment, it is determined that the vehicle VC is displacing using image data or the like output by the camera 22, and the slip is detected based on the fact that the wheel speed detected by the wheel speed sensor 48 is zero. However, it is not limited to this. For example, based on the image data output by the camera 22, when snow or water is detected on the road surface, it may be determined that the road is a low friction test road, and the slip may be detected in consideration of whether the low friction test road.

The process for detecting the slip is not limited to using the output of the device capable of detecting relative displacement between the vehicle VC and the object around the vehicle VC, such as image data output by the camera 22. For example, a process of, calculating a slip ratio based on the output signal of the wheel speed sensor 48 and determining that the slip has occurred when the slip ratio is equal to or greater than a threshold value, may be added. According to this process, even when the tires are not locked, the process of S24 can be executed. Here, the slip ratio of each of the four wheels may be a value obtained by dividing the difference, between the vehicle body speed and the target wheel speed, by the vehicle body speed and multiplying the result by 100. The speed of each wheel and the speed of the vehicle body are converted into the speed of a specific rotating body, or converted into the speed of the vehicle body, and thereafter the slip ratio is calculated. Here, for example, the threshold may be set to a smaller value for the low friction test road than a value for the high friction test road. Thereby, it is possible to reduce the margin when setting the threshold in consideration of the influence of the calculation error of the slip ratio. At this time, the image data output by the camera 22 may be used to determine whether the road is a low friction test road.
"Object Detection Process"

The object detection process is not limited to the process using the image data Dim and the millimeter wave data Dmw. For example, distance measurement point group data output by an optical sensor that receives reflected light accompanying irradiation of light such as near-infrared rays may be used. Further, the output of a sensor that receives the reflected wave accompanying the irradiation of ultrasonic waves may be used. Regarding these four, all four of them may be used, only three of them may be used, only two of them may be used, or only one of them may be used.
"Steering Angle Operation Process"

In the above embodiment, when it is determined that the obstacle has been avoided, the process of returning the wheel-turning angle θs to the predetermined angle corresponding to the value before the start of the avoidance process is executed. However, the present disclosure is not limited to this. For example, when there are no objects other than obstacles that come into contact with the vehicle VC around the vehicle VC, safety can be ensured simply by avoiding the obstacles and stopping.

FIGS. 2, 6, and 8 illustrate the process of outputting the wheel-turning angle command value θs* for avoiding obstacles to the wheel-turning ECU 30. However, the present disclosure is not limited to this. For example, when the ADAS ECU 60 and the wheel-turning ECU 30 are integrally formed as described in the section of "Driving assistance apparatus" below, the process may be a process for outputting an operation signal to the wheel-turning actuator 32.
"Limit Process"

In the process of S24, the hydraulic pressure is controlled to the minimum value to control the braking force applied to the brake actuators 41 to 44 to the minimum. However, the present disclosure is not limited to this. For example, the process may be a process in which the hydraulic pressure is lowered relative to the hydraulic pressure indicated by the ABS, but the hydraulic pressure is not lowered to the minimum value. Even in that case, the lateral force can be increased compared to the case where the hydraulic pressure is not lowered.

In the process of S24a, the braking force applied to the front wheel brake actuators 41 and 42 is minimized. However, the present disclosure is not limited to this. For example, the process may be a process in which the hydraulic pressure is lowered relative to the hydraulic pressure indicated by the ABS, but the hydraulic pressure is not lowered to the minimum value. Even in that case, the lateral force can be increased compared to the case where the hydraulic pressure is not lowered.

In the process of FIG. 6, the braking force of both rear wheels is set to be larger than the braking force of the front wheels. However, the present disclosure is not limited to this. For example, only the braking force of the inner wheels of the rear wheel may be set to be larger than the braking force of the front wheels. This also makes it easier to turn the vehicle VC.

In FIGS. 2, 6, and 8, the braking force is limited to a smaller value after the absolute value of the difference between the wheel-turning angle θs and the wheel-turning angle command value θs* becomes equal to or less than the threshold value Δθs. However, the present disclosure is not limited to this. For example, the braking force may be limited to a smaller value at the same time as the execution timing of the process of S18. Further, for example, the braking force may be limited to a smaller value prior to the execution timing of the process of S18.

It is not essential that the process of S18 is executed for the process of limiting the braking force to the smaller value. For example, when the driver turns the steering wheel sharply to avoid an obstacle, the braking force may be limited to a smaller value. Thereby, the driver can turn the vehicle VC as intended. In this case, regardless of the driver's brake operation, the process of forcibly limiting the braking force to the smaller value is executed at least until the avoidance of the obstacle is completed.

FIGS. 2, 6, and 8 illustrate the process of outputting a command to limit the braking force to the smaller value to the brake ECU 40. However, the present disclosure is not limited to this. For example, when the ADAS ECU 60 and the brake ECU 40 are integrally formed as described in the section of "Driving assistance apparatus" below, the process may be a process for outputting an operation signal to the brake actuator 41 to 44.

"Friction Reduction Process"

The drive system to be operated for a friction reduction process is not limited to the engine 52. For example, as described in the section "Drive system" below, when the drive system includes a rotating electric machine, a drive circuit may be connected to the rotating electric machine.

In the above-described embodiment, the friction reduction process is executed when the friction coefficient $\mu$ of the road surface is equal to or less than a specified value $\mu L$. However, the present disclosure is not limited to this. For example, whether to execute the friction reduction process may be determined based on the friction coefficient $\mu$ and the amount of turning required for displacement to the avoidable area. Further, for example, the magnitude of torque for reducing friction may be variable according to the magnitude of friction coefficient $\mu$.

In FIG. 8, the friction reduction process is implemented by the process of outputting the command value of a friction canceling torque to the engine ECU 50. However, the present disclosure is not limited to this. For example, when the ADAS ECU and the drive system ECU are integrally formed as described in the section of "Driving assistance apparatus" below, the process may be a process for outputting an operation signal to the drive circuit of the engine, the rotating electric machine, or the like. In other words, the operation signal may be output to the thrust generation device of the vehicle VC.

"Driving Assistance Apparatus"

The driving assistance apparatus is not limited to the ADAS ECU 60. For example, the ADAS ECU 60 and the drive system ECU such as the engine ECU 50 may be integrally formed. Further, for example, the ADAS ECU 60 and the brake ECU 40 may be integrally formed. Further, for example, the ADAS ECU 60 and the wheel-turning ECU 30 may be integrally formed. Further, for example, the ADAS ECU 60 and an ECU for detecting an object outside the vehicle VC and obtaining a detection result, such as the millimeter wave ECU 10, may be integrally formed.

The driving assistance apparatus is not limited to one that includes a CPU and a program storage device that stores a program and executes a software process. For example, a dedicated hardware circuit such as an ASIC may be provided to perform a hardware process for at least part of results obtained by the software process in the above embodiment. That is, the driving assistance apparatus may have any one of the following configurations (a) to (c). (a) The driving assistance apparatus includes a process device for executing all of the above processes according to a program, and a program storage device. (b) The driving assistance apparatus includes a process device and a program storage device for executing a part of the above processes according to a program, and a dedicated hardware circuit for executing the remaining processes. (c) The driving assistance apparatus includes a dedicated hardware circuit to perform all of the above processes. Here, there may be multiple software execution devices provided with the process device and the program storage device, or multiple dedicated hardware circuits.

"Computer"

A computer for assisting traveling is not limited to the CPU 62 illustrated in FIG. 1. For example, among the processes shown in FIG. 2, the process of S16 may be executed by a mobile terminal of the user, and the remaining processes may be executed by the CPU 62.

"Drive System"

The drive system is not limited to the one provided with the engine 52. For example, the vehicle thrust generation device may include the engine 52 and the rotating electric machine, or may include only the rotating electric machine.

Although the present disclosure has been described in accordance with the examples, it is understood that the disclosure is not limited to such examples or structures. The present disclosure incorporates various modifications and variations within the scope of equivalents. Furthermore, various combination and formations, and other combinations and formations including one, more than one or less than one element are also within the scope of the present disclosure.

The invention claimed is:

1. A driving assistance apparatus applied to a vehicle including a wheel-turning actuator that turns a wheel and a brake actuator, the apparatus comprising a processor configured to:
    detect slip of the vehicle on a road surface on which the vehicle travels;
    limit a magnitude of a braking force of the brake actuator to a smaller magnitude; and
    when the wheel-turning actuator of the vehicle turns the wheel in order to avoid an obstacle and when the slip has been detected, limit the magnitude of the braking force of the brake actuator to the smaller magnitude in at least a period for avoiding the obstacle.

2. The driving assistance apparatus according to claim 1, wherein
    the processor is further configured to:
        detect an object outside the vehicle; and
        determine whether the vehicle has avoided the object based on a detection result, and
    an end point of the period for avoiding the obstacle is a time when the processor determines that the vehicle has avoided the obstacle.

3. The driving assistance apparatus according to claim 2, wherein
    the processor is further configured to:
        set an area where the vehicle does not contact with the obstacle based on the detection result;
        operate a wheel-turning angle of the wheel for moving the vehicle to the set area; and
        limit the magnitude of the braking force when operating the wheel-turning angle.

4. The driving assistance apparatus according to claim 3, wherein
    the processor is further configured to:
        return the wheel-turning angle when the vehicle has moved to the set area; and
        continue to limit the magnitude of the braking force to the smaller magnitude until return of the wheel-turning angle is completed.

5. The driving assistance apparatus according to claim 1, wherein
    the processor is further configured to stop the vehicle by operating the brake actuator in a case where a driver has released a brake when a limit of the magnitude of the braking force to the smaller magnitude is released.

6. The driving assistance apparatus according to claim 1, wherein the brake actuator is configured to apply the braking force to a front wheel of the vehicle and a rear wheel of the vehicle independently, and the processor is further configured to set the braking force of the rear wheel to be larger than the braking force of the front wheel when limiting the magnitude of the braking force of the front wheel to the smaller magnitude.

7. The driving assistance apparatus according to claim 6, wherein the processor is further configured to:

acquire friction information that is information related to a friction coefficient of a road surface on which the vehicle travels; and perform, according to the friction information, switching between a setting of the magnitude of the braking force of each of a front wheel and a rear wheel to the smaller magnitude and a setting of the magnitude of the braking force of the rear wheel to be larger than the braking force of the front wheel.

8. The driving assistance apparatus according to claim 1, wherein the processor is further configured to, when limiting the magnitude of the braking force to the smaller magnitude, operate a drive system of the vehicle to reduce a load torque added, by the drive system, to a drive wheel.

9. The driving assistance apparatus according to claim 8, wherein the processor is further configured to:

acquire friction information that is information related to a friction coefficient of the road surface on which the vehicle travels; and determine, according to the friction information, whether to operate the drive system to reduce the load torque when limiting the magnitude of the braking force.

10. A driving assistance method comprising:

detecting slip of a vehicle on a road surface on which the vehicle travels, wherein the vehicle includes a wheel-turning actuator that turns a wheel-turning wheel and a brake actuator;

limiting a magnitude of a braking force of the brake actuator to a smaller magnitude; and when the wheel-turning actuator of the vehicle turns the wheel-turning wheel in order to avoid an obstacle and when the slip has been detected, limiting the magnitude of the braking force of the brake actuator to the smaller magnitude in at least a period for avoiding the obstacle.

11. A computer-readable non-transitory storage medium storing a driving assistance program configured to cause a processor to:

detect slip of a vehicle on a road surface on which the vehicle travels, wherein the vehicle includes a wheel-turning actuator that turns a wheel and a brake actuator;

limit a magnitude of a braking force of the brake actuator to a smaller magnitude; and when the wheel-turning actuator of the vehicle turns the wheel in order to avoid an obstacle and when the slip has been detected, limit the magnitude of the braking force of the brake actuator to the smaller magnitude in at least a period for avoiding the obstacle.

\* \* \* \* \*

UNITED STATES PATENT AND TRADEMARK OFFICE
CERTIFICATE OF CORRECTION

| | | |
|---|---|---|
| PATENT NO. | : 12,397,760 B2 | Page 1 of 1 |
| APPLICATION NO. | : 18/364270 | |
| DATED | : August 26, 2025 | |
| INVENTOR(S) | : Yuuki Ozawa | |

It is certified that error appears in the above-identified patent and that said Letters Patent is hereby corrected as shown below:

On the Title Page

Item (54) and in the Specification, Column 1, Lines 1-3, Title, replace:
"DRIVING ASSISTANCE APPARATUS, DRIVING ASSISTANCE METHOD, AND DRIVING ASSISTANCE PROGRAM"

With:
-- DRIVING ASSISTANCE APPARATUS, DRIVING ASSISTANCE METHOD, AND STORAGE MEDIUM STORING DRIVING ASSISTANCE PROGRAM --

Signed and Sealed this
Twenty-eighth Day of October, 2025

John A. Squires
*Director of the United States Patent and Trademark Office*